(12) United States Patent
Morken

(10) Patent No.: US 7,363,743 B2
(45) Date of Patent: Apr. 29, 2008

(54) SAFETY BOBBER

(76) Inventor: Daniel E. Morken, 2241 Longleaf Dr., Fort Wayne, IN (US) 46814

( * ) Notice: Subject to any disclaimer, the term of this patent is extended or adjusted under 35 U.S.C. 154(b) by 81 days.

(21) Appl. No.: 11/000,229

(22) Filed: Nov. 30, 2004

(65) Prior Publication Data

US 2005/0120615 A1    Jun. 9, 2005

Related U.S. Application Data

(63) Continuation-in-part of application No. 10/726,445, filed on Dec. 3, 2003, now abandoned.

(51) Int. Cl.
*A01K 93/00* (2006.01)

(52) U.S. Cl. ..................... 43/44.9; 43/44.87
(58) Field of Classification Search .............. 43/44.87, 43/44.89, 44.9, 44.91, 44.92, 44.95
See application file for complete search history.

(56) References Cited

U.S. PATENT DOCUMENTS

| 786,597 | A | | 4/1905 | Picken | |
|---|---|---|---|---|---|
| 2,498,815 | A | | 2/1950 | McVay | 43/43.11 |
| 2,592,411 | A | | 4/1952 | Louthan | 43/43.11 |
| 2,645,051 | A | | 7/1953 | Stofleth | 43/17.2 |
| 2,678,511 | A | | 5/1954 | Wright | 43/43.11 |
| 2,741,864 | A | * | 4/1956 | Shotton | 43/44.9 |
| 2,825,175 | A | * | 3/1958 | Skvier | 43/44.91 |
| 2,834,142 | A | | 5/1958 | Saye | 43/44.87 |
| 2,847,792 | A | | 8/1958 | Kuhlmann | 43/44.9 |
| 2,965,999 | A | * | 12/1960 | Marsh | 43/44.87 |
| 3,037,318 | A | * | 6/1962 | Schultz | 43/44.87 |
| 3,056,229 | A | | 10/1962 | Haney | 43/44.87 |
| 3,163,957 | A | | 1/1965 | Barrett | 43/41.2 |
| 3,273,278 | A | | 9/1966 | Lynch | 43/44.87 |
| 3,353,294 | A | * | 11/1967 | Mundorff et al. | 43/44.91 |
| 3,686,787 | A | | 8/1972 | Milovich | 43/44.9 |
| 3,760,527 | A | | 9/1973 | Hamren | 43/44.88 |
| 3,967,407 | A | | 7/1976 | Halbasch | 43/44.9 |
| 4,222,194 | A | | 9/1980 | Thorvaldsen | 43/41.2 |
| 4,449,318 | A | | 5/1984 | Lane | 43/44.9 |
| 4,534,127 | A | | 8/1985 | Thorvaldsen | 43/41.2 |
| 4,649,663 | A | | 3/1987 | Strickland | 43/44.9 |
| 4,696,125 | A | * | 9/1987 | Rayburn | 43/43.14 |
| 5,123,196 | A | * | 6/1992 | Pagano et al. | 43/37 |
| 5,274,945 | A | * | 1/1994 | Ross | 43/17.5 |
| 5,279,066 | A | | 1/1994 | Camera | 43/43.1 |
| 5,398,440 | A | * | 3/1995 | Amundsen | 43/44.9 |

(Continued)

FOREIGN PATENT DOCUMENTS

EP    0519108    6/1991

(Continued)

OTHER PUBLICATIONS

US 4,359,936, 11/1982, Yuji (withdrawn)

*Primary Examiner*—David Parsley
(74) *Attorney, Agent, or Firm*—Taylor & Aust, P.C.

(57) ABSTRACT

A fishing bobber including a flotation body with an open unfilled cavity therein and a tube apparatus at least partially projecting into the cavity, the tube apparatus having a first end with a first diameter opening and a second end with a second diameter opening. The first diameter being larger than the second diameter.

2 Claims, 4 Drawing Sheets

U.S. PATENT DOCUMENTS

| | | | |
|---|---|---|---|
| 5,456,041 A | * 10/1995 | Schoeberlein | 43/44.91 |
| 5,758,451 A | 6/1998 | Wolfe | 43/44.91 |
| 5,784,828 A | 7/1998 | Thompson | 43/44.9 |
| 5,926,991 A | 7/1999 | Chestnut | 43/19 |
| 6,519,894 B1 | 2/2003 | Geary | 43/42.1 |

FOREIGN PATENT DOCUMENTS

| | | | |
|---|---|---|---|
| JP | 11-196737 | * | 7/1999 |

* cited by examiner

SAFETY BOBBER

CROSS REFERENCE TO RELATED APPLICATIONS

This is a continuation-in-part of U.S. patent application Ser. No. 10/726,445, entitled "SAFETY BOBBER", filed Dec. 3, 2003 now abandoned.

BACKGROUND OF THE INVENTION

1. Field of the invention.

The present invention relates to a fishing bobber, and, more particularly, to a fishing bobber with a cavity therein.

2. Description of the related art.

Humankind has pursued fishing for survival, for commercial purposes and for sport. Pursuit of sport fishing has produced a plethora of products in the way of boating innovations, fish finders, lures, fishing lines, reels, fishing rods and other tackle.

The basic equipment of fishing consists of a barbed metal hook at the end of a fishing line and a wood, fiberglass or metal pole, that usually has some type of spool or reel, near the handle, around which the fishing line is wound. Recreational fishing is practiced throughout the world and is done in freshwater and saltwater. The most popular game fish are salmon, trout, bass and pike in freshwater and sailfish, tuna, marlin, tarpon and bonefish in saltwater. There are two basic types of freshwater tackle, those for fly-casting and those for bait-casting.

Live bait or a variety of plugs, spoons and other artificial lures can be cast and pulled in, popped along the surface, trolled from a moving boat or allowed to rest at a predefined position in the water assisted by a bobber floating on the surface. Spinning tackle requires an angler to keep the lure moving by repeatedly casting the spinning tackle and reeling it back in. Bait fishing includes applying a bait to a hook and casting the bait, which may be additionally weighted, into a likely area where fish may be, and allowing the bait to be suspended in the water to tempt the fish. Often a fishing bobber is used to hold the bait at a suspended distance from the surface of the water. The fisherman then watches the bobber as an indicator of when a fish is nibbling or has taken the bait. Movement of the bobber alerts the fisherman to pull on the fishing line in an attempt to set the hook in the fish's mouth.

A fisherman experiences a great deal of annoyance if his hook gets caught on a foreign object. Worse than being annoyed is being hooked by the barbed point of the fishing hook itself either on the fisherman's clothing or person. This can happen when nearly the entire fishing line has been retrieved on a fishing reel and the fisherman reaches out to take a hold of the line close to the hook. Additionally, if a fish, that is caught on the hook, is nearly to the fisherman and the fisherman is reaching along the line to grasp the fish and the fish throws the hook, the pressure on the line can drive the hook into the fisherman's outstretched hand.

What is needed in the art of fishing is a device to eliminate an exposed fishing barb upon the retrieval of a fishing line.

SUMMARY OF THE INVENTION

The present invention provides a fishing bobber that accommodates a fishing hook.

The invention comprises, in one form thereof, a fishing bobber including a flotation body with an open unfilled cavity therein and a tube apparatus at least partially projecting into the cavity, said tube apparatus having a first end with a first diameter opening and a second end with a second diameter opening. The first diameter being larger than the second diameter.

An advantage of the present invention that it protects a fisherman from being snagged by a fishing hook.

Another advantage of the present invention is that it reduces the incident of a fishing hook snagging a piece of floating debris.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrates one preferred embodiment of the invention, in one form, and such exemplification is not to be construed as limiting the scope of the invention in any manner.

DETAILED DESCRIPTION OF THE INVENTION

Figure 1:
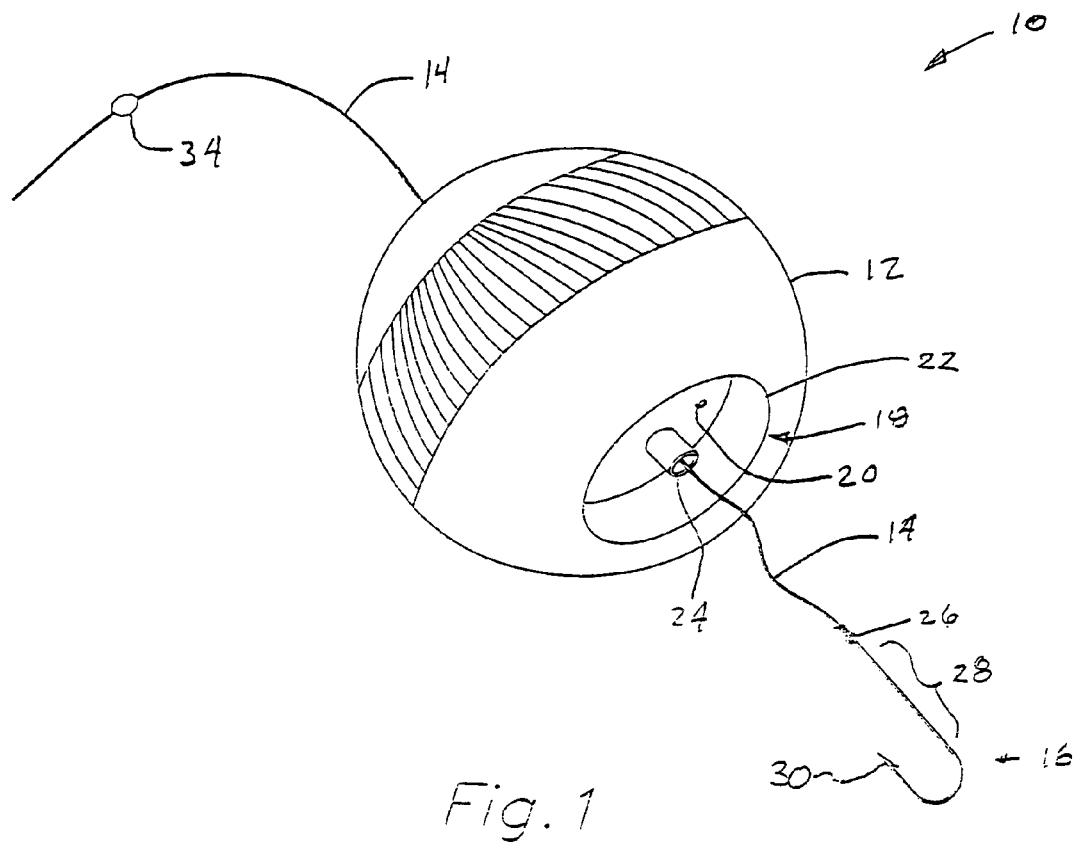
FIG. 1 is a perspective view of a safety bobber system embodying the present invention.
Figure 2:
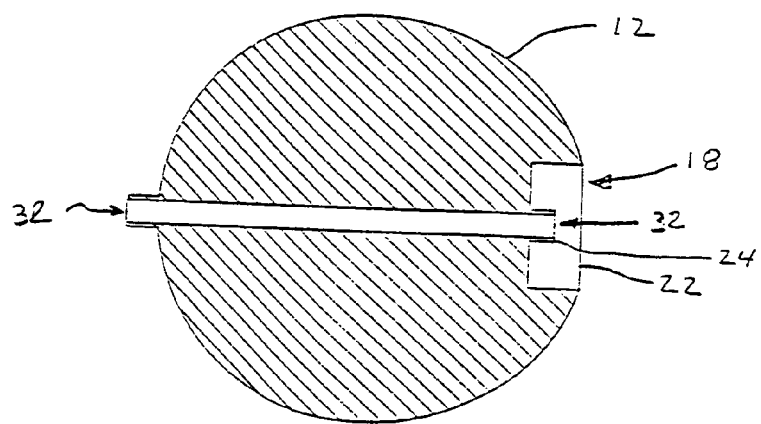
FIG. 2 is cross-sectional view of the bobber of FIG. 1.
Figure 3:
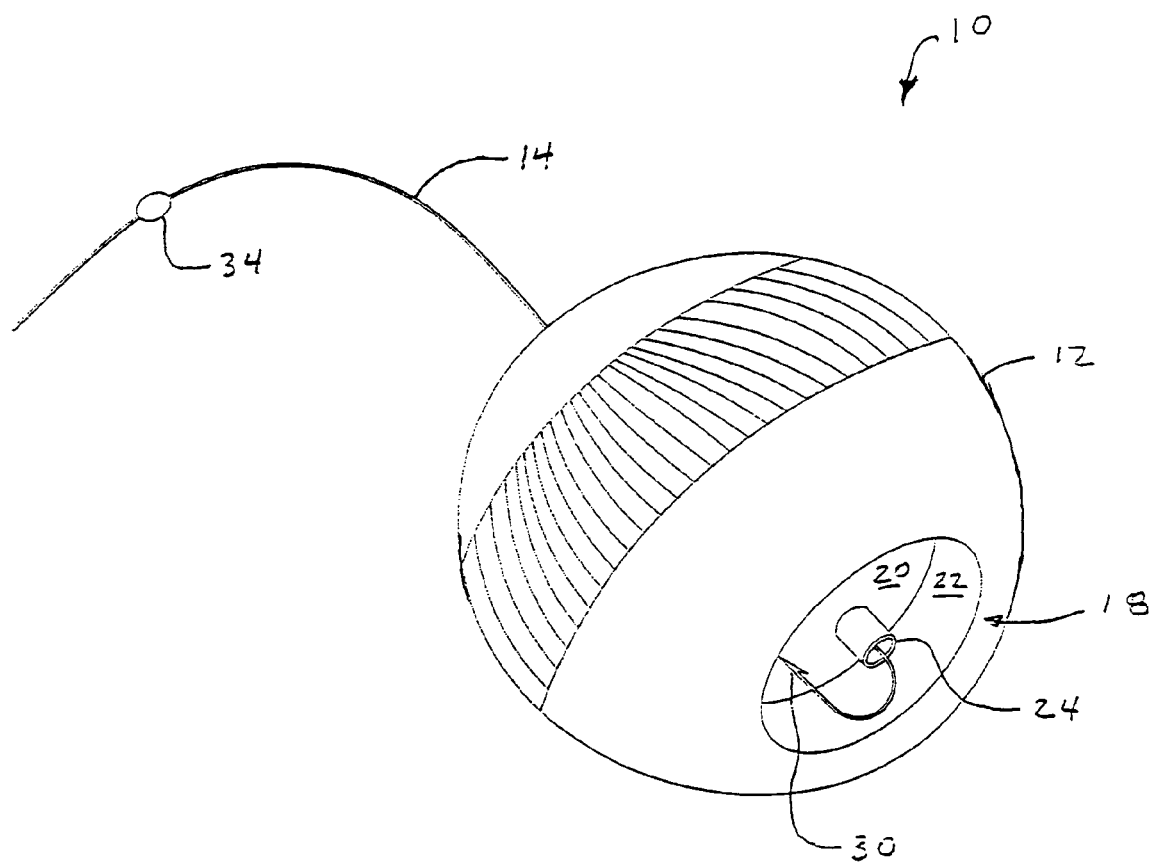
FIG. 3 is a perspective view of the bobber of FIGS. 1 and 2, illustrating a fishing hook in a protected position.

Referring now to the drawings, and, more particularly to FIGS. 1-3, there is shown a safety bobber system 10 including a bobber body 12, fishing line 14 and fishing hook 16.

Bobber body 12, also known as a floatation body 12, includes a cavity 18 with a cavity wall 20 and a cavity side wall 22, and tube 24. Cavity 18 is a cylindrically shaped cavity at one end of bobber body 12. Cavity 18 has a diameter that is greater than the depth of cavity 18. Cavity 18 is concentrically located relative to tube 24. Cavity wall 20 is a puncture resistant surface, which accommodates a fishing hook point. Tube 24 protrudes into cavity 18 to receive a portion of fishing hook 16 therein. Tube 24 may even extend beyond the depth of cavity 18.

Fishing hook 16 includes an eye 26, a shank 28 and a barbed point 30. Fishing line 14 is secured to fishing hook 16 by utilizing the opening in eye 26 through which fishing line 14 is threaded and tied to. As fishing line 14 is pulled through bobber 12, eye 26 and shank 28 enter into tube 24 and barbed point 30 is stopped by contact with cavity wall 20. Alternatively, tube 24 may extend far enough so that fishing hook 16 is stopped before barbed point 30 contacts cavity wall 20.

Tube 24 extends through bobber 12 having an opening 32 therethrough. Tube 22 may be integral with bobber body 12 or may be a separate tube with bobber body 12 molded therearound. Opening 32 is sized such that it will accommodate the entry of eye 26 and shank 28 of fishing hook 16.

A line stop 34 is compressed onto fishing line 14 to control the depth at which bait, placed upon fishing hook 16, will be suspended in a body of water. Line stop 34 is of sufficient size to preclude it's entry into opening 32.

Bobber system 10 is assembled by threading fishing line 14 through opening 32 then securing fishing line 14 to eye 26 of fishing hook 16. Fishing hook 16 is baited and bobber system 10 is cast along with baited hook 16. When bobber system 10 hits the surface of the water, the weight of the bait and hook 16 draws line 14 through bobber system 10. The movement of line 14 is stopped when line stop 34 contacting the outer perimeter of opening 32.

If the bait on hook 16 is taken by a fish, leaving hook 16 unbaited, the fisherman reels in line 14 causing eye 26 and shank 28 to enter into opening 32 as bobber system 10 is retrieved back to the fisherman. If at least a part of the bait remains on hook 16, then shank 28 may not fully enter into tube 24. Nonetheless, the positioning of at least a portion of shank 28 in tube 24 substantially shields barbed point 30 from catching on a foreign object as bobber system 10 is retrieved and protects the hands and clothing of the fisherman from barbed point 30.

When the fisherman successfully hooks a fish on hook 16, as line 14 is retrieved, bobber body 12 slides along line 14 and positions itself proximate to the fish. As a fisherman applies tension to line 14, and as the fish draws near to the fisherman, it is a common practice for the fisherman to run his hand along line 14 and should the fish throw hook 16 the tension on the line will draw shank 28 into tube 24 to thereby shield barbed point 30 from contacting the fisherman.

Figure 4:
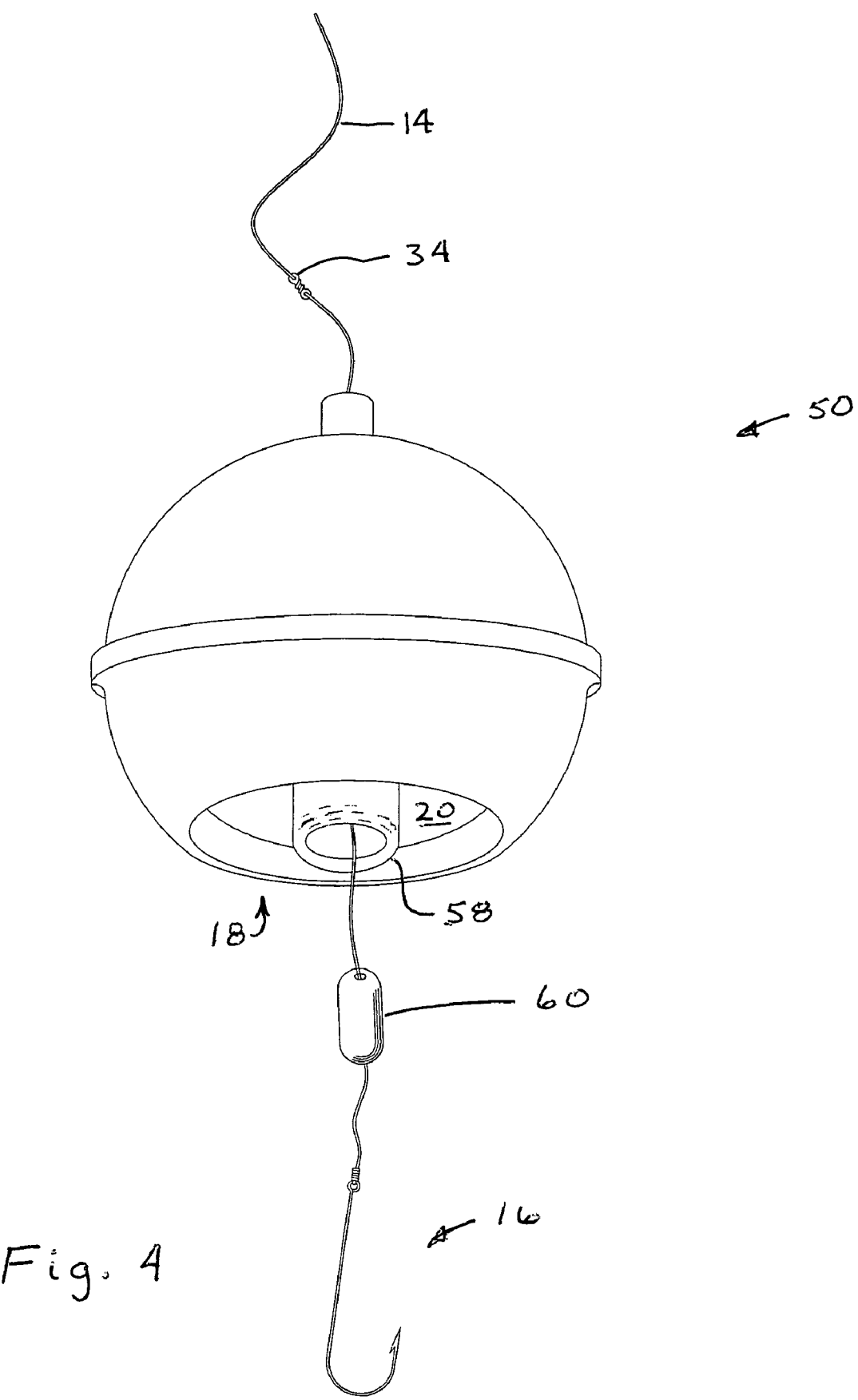
FIG. 4 is a perspective view of a safety bobber system of another embodiment of the present invention.
Figure 5:
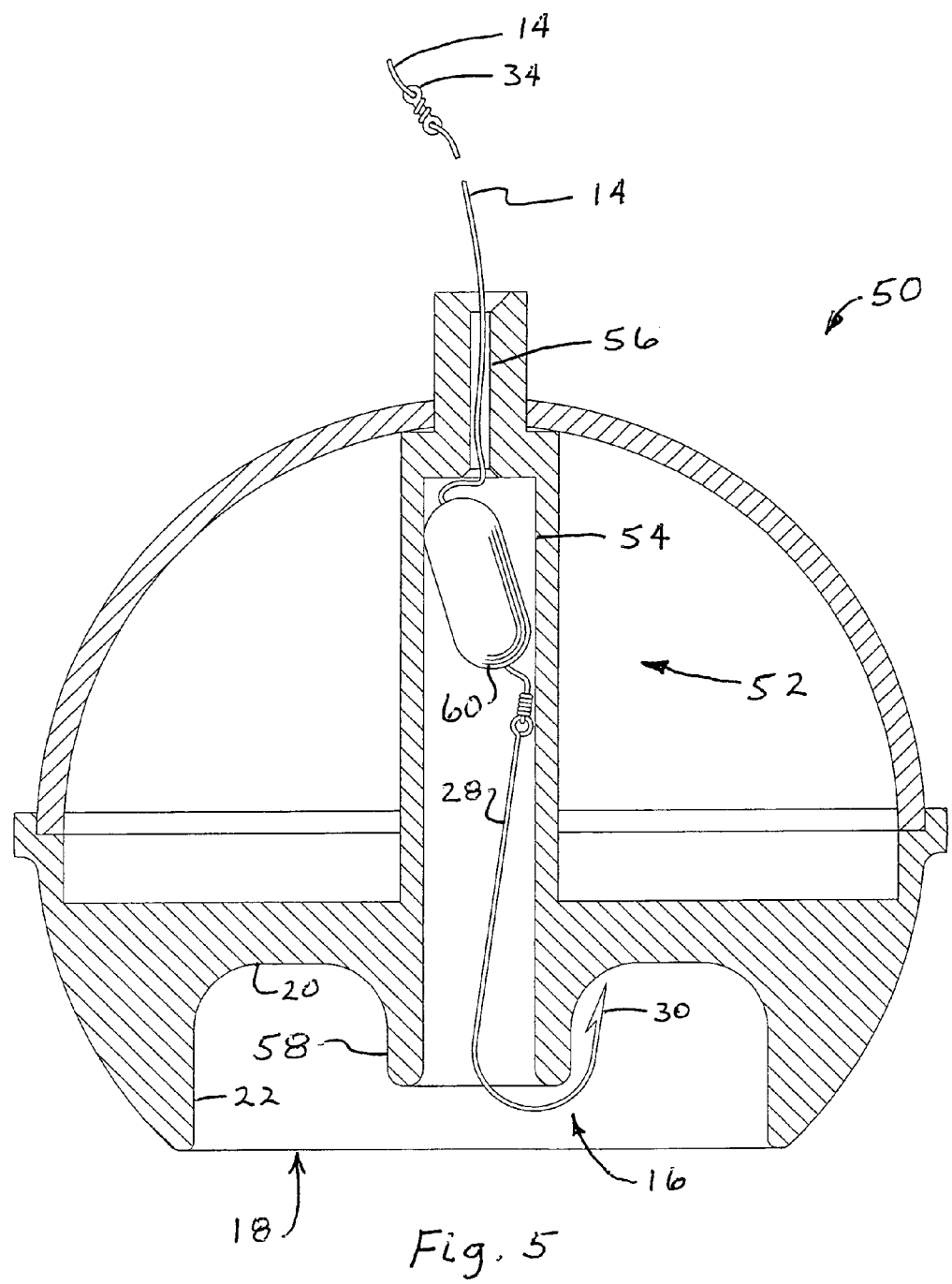
FIG. 5 is a cross-sectional view of the bobber of FIG. 4.

Now additionally referring to FIGS. 4 and 5 there is shown a bobber system 50 including a tube assembly 52. Tube assembly 52 includes a first passageway 54 and a second passageway 56. First passageway 54 is a substantially hollow cylinder having a diameter that is larger than the diameter of passageway 56. Passageway 54 extends substantially over the full length of bobber assembly 50 and allows for a sinker 60 along with a portion of fishing hook 16 to enter therein. Fishing line 14 is threaded through passageway 56 and 54 to be coupled with hook 16. Passageway 56 is less than half the diameter of passageway 54 and allows for the traversal fishing line 14 therethrough. Passageway 54 may be at least three times larger in diameter than passageway 56. At the end of passage way 56 the opening maybe flared or radiused in order to accommodate the threading of fishing line therethrough and to eliminate a sharp corner, which may harm the line. A line stop 34 prevents fishing line 14 from threading without end through tube assembly 52.

Additionally, tube assembly 52 has a projection 58, which extends at least part way into cavity 18. The end of projection 58 is radiused to accommodate a smooth transition of line 14, sinker 60 and hook 16 into passageway 54. Cavity 18 has a diameter and a depth. The diameter of cavity 18 being larger than the depth of cavity 18. Bobber assembly 50 is substantially spherical having tube assembly 52 extending through bobber assembly 50 substantially over the full length of bobber assembly 50. Tube assembly 52 may be separate from or integral with the rest of bobber assembly 50.

In operation, hook 16 is baited and bobber assembly 50 along with hook 16 and sinker 60 are cast to a point on the surface of a body of water. Upon hitting the water the natural buoyancy of bobber assembly 50 causes it to float on the surface while sinker 60 pulls line 14 through passageways 56 and 54 and projection 58 until line stop 34 encounters an end of passageway 56. This serves to position hook 16 at a set distance below the surface of the water. Upon retrieving bobber assembly 50 and hook 16, fishing line 14 is pulled causing sinker 60 and hook 16 to approach and then enter into passageway 54. If a fish has been caught on hook 16, the end of bobber assembly 50 simply rests against a portion of the fish as the fish is retrieved. Alternatively, if no fish has been caught, shank 28 of fishing hook 16 enters into passageway 54 and barbed point 30 enters into cavity 18 and is positioned against a wall of cavity 18.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A fishing bobber, comprising:
a two-piece flotation body having a substantially spherical exterior surface, the first piece of said flotation body being substantially hemispherical and hollow, the second piece of said flotation body being substantially hemispherical with a flattened bottom, said second piece of said flotation body having an open unfilled unenclosed cavity extending directly inwardly from said flattened bottom of said second piece of said flotation body, an upper portion of said second piece of said flotation body opposite the flattened bottom portion includes a flange portion and an outer peripheral tab extending upwardly from said flange, the first piece of said flotation body being directly connected to the flange of said second piece of said flotation body by resting upon said flange and an outer surface of said bottom of said first piece of said flotation body directly engaging an inner surface of said peripheral tab of said second piece of said flotation body; and
a tube integral with the second piece of said flotation body extending partially into said cavity and said second piece of said flotation body, said tube extending upwardly from said second piece of said flotation body into said first piece of said flotation body and extending entirely through a hole in said upper portion of said first piece of said flotation body, said tube having a lower portion having a first outer diameter, an upper portion having a second outer diameter and a medial portion disposed between the upper and lower portions, the first outer diameter being greater than said second outer diameter and said first outer diameter and said second outer diameter connected directly to each other at said medial portion, said bottom portion of said tube having a first opening, said medial portion of said tube having a second opening and said upper portion of said tube having a third opening, said first opening having a flared portion disposed inside said cavity, said second opening tapering upwardly toward said third opening and said third opening tapering downwardly toward said second opening, said third opening smaller than said first opening and larger than said second opening, said cavity being adapted to receive the curved portion and barbed portion of a fishing hook, said first opening and tube adapted to receive a shank portion of said fishing hook and a fishing sinker, and said tube in said first and second openings adapted to receive a fishing line.

2. The fishing bobber of claim 1, wherein said tube having an inner diameter that extends as a hollow cylinder through at least one half of the length of said tube.

* * * * *